United States Patent
Bahl et al.

(10) Patent No.: US 6,343,270 B1
(45) Date of Patent: Jan. 29, 2002

(54) METHOD FOR INCREASING DIALECT PRECISION AND USABILITY IN SPEECH RECOGNITION AND TEXT-TO-SPEECH SYSTEMS

(75) Inventors: Lalit R. Bahl, Port Jefferson; Paul S. Cohen, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/207,966

(22) Filed: Dec. 9, 1998

(51) Int. Cl.[7] ........................ G10L 15/18; G10L 15/26
(52) U.S. Cl. .................... 704/257; 704/235; 704/260
(58) Field of Search ................................ 704/235, 257, 704/260

(56) References Cited

U.S. PATENT DOCUMENTS

| | | | | |
|---|---|---|---|---|
| 5,694,520 A | * | 12/1997 | Lyberg | 704/254 |
| 5,865,626 A | * | 2/1999 | Beattie et al. | 434/185 |
| 6,061,646 A | * | 5/2000 | Martino et al. | 704/3 |
| 6,064,963 A | * | 5/2000 | Gainsboro | 704/270 |

OTHER PUBLICATIONS

A. P. Breen, et al. "Designing the next generation of text–to–speech systems," Proc. IEE Colloquium on Techniques for Speech Processing and their Applications, vol. 6, p. 1–5, 1994.*

Francis Kubala, et al. "Transcribing radio news", Proc. International Conference on Spoken Language, ICSLP 96, vol. 2, p. 598–601, Oct. 1996.*

James Bonnyman, et al. "Real time analysis for the synthesis of high quality male, female and child speech", Proc. Third IEEE Symp. on Electronics, Circuits, and Systems, ICECS 96, vol. 1, p. 530–533, Oct. 1996.*

V. Diakoloukas, et al. "Development of dialect–specific speech recognizers using adaptation methods," Proc. IEEE ICASSP 97, vol. 2, p. 1455–1458, Apr. 1997.*

* cited by examiner

Primary Examiner—Talivaldis I. Smits
(74) Attorney, Agent, or Firm—F. Chau & Associates,LLP

(57) ABSTRACT

In accordance with the present invention, a method for increasing both dialect precision and usability in speech recognition and text-to-speech systems is described. The invention generates non-linear (i.e. encoded)baseform representations for words and phrases from a pronunciation lexicon. The baseform representations are encoded to incorporate both pronunciation variations and dialectal variations. The encoded baseform representations may be later expanded (i.e. decoded) into one or more linear dialect specific baseform representations, utilizing a set of dialect specific phonological rules.

The method comprises the steps of: constructing an encoded pronunciation lexicon having a plurality of encoded and unencoded baseforms; inputting one or more user specified dialects; selecting dialect specific phonological rules from a rule set database; and decoding the encoded pronunciation lexicon using the dialect specific phonological rules to yield a dialect specific decoded pronunciation lexicon.

24 Claims, 4 Drawing Sheets

"ECONOMICS"

<EH/IY> K AX N <AA/AO> M IX K S

"Economics"

"Economics"

"Economics"

[NEW YORK]

EH K AX N AA M IX K S
IY K AX N AA M IX K S

[CANADIAN]

"ECONOMICS"

METHOD FOR INCREASING DIALECT PRECISION AND USABILITY IN SPEECH RECOGNITION AND TEXT-TO-SPEECH SYSTEMS

BACKGROUND OF THE INVENTION

1. Technical Field

The present invention relates to speech processing systems and, more particularly, to a method and device for increasing the dialect precision and usability in speech recognition and text-to-speech systems.

2. Discussion of Related Prior Art

Generally, in a speech recognition system, each word of a vocabulary to be recognized is represented by a baseform wherein a word is divided for recognition purposes into a structure of phones, i.e. phonetic elements as shown in FIG. 1. See also, F. Jelinek, "Continuous Speech Recognition by Statistical Methods", Proceedings IEEE, Vol. 64, 1976, pp. 532–576, incorporated by reference herein.

These phones correspond generally to the sounds of vowels and consonants as are commonly used in phonetic alphabets. In actual speech, a portion of a word may have different pronunciations, as indicated in FIG. 2. FIG. 2 illustrates a freely choosable pronunciation alternative, with the first phone of the word having two pronunciation alternatives.

A typical speech recognition system would store a separate and distinct linear baseform representation for each pronunciation alternative, where each representation consists of a unique linear combination of phones or phonemes. For the "economics" exemplar, the speech recognition system would store two separate linear strings, as illustrated at FIG. 2.

In addition to freely choosable pronunciation variations, typical speech recognition systems also store dialectal alternatives in a similar manner. FIG. 3 illustrates a dialectal alternative for the exemplar "economics" illustrating both a New York City area and a Canadian pronunciation. FIG. 3 illustrates two dialectal alternatives; however, any number of dialectal variations may be considered by the method. FIG. 3 illustrates a dialectal variation at the fifth phone of the word. A typical speech recognition system would be required to store four separate linear baseform representations for the exemplar "economics" to account for a single freely choosable pronunciation alternative and a single dialectal alternative.

For certain applications storing each of the baseform representations of a word is acceptable; in the general case, however, it can lead to problems. If, for example, you discover that additional variation must be considered subsequent to an initial construction stage, the process of editing the pronunciation lexicon can become tedious and subject to errors as a consequence of making each change manually. Another associated drawback of storing every conceivable baseform representation of a word or phrase occurs in real-time applications where a primary objective of the speech recognition system is to minimize the error rate. The common element in such real-time applications is that the speech recognition system is not afforded the luxury of enrolling the speaker (i.e. determining his or her speech characteristics in a sample session). Typical real-time applications may include, for example, a person walking up to a kiosk in a mall or subscribing over the telephone. By pre-storing all of the possible baseform representations in the lexicon, the speech recognition is more error-prone given the greater number of choices and no capacity to develop a characterization model of an individual to weight one pronunciation and/or dialect over another.

Accordingly, it would be desirable to provide a method and device for reducing the size of the pronunciation lexicon by storing only the reasonable pronunciations for a particular dialect or set of dialects. It is also desirable to eliminate errors inherent in manually inputting one or more variant baseforms, where such variations can be on the order of fifty or more in certain applications. Further, it is also desirable to reduce the cost and drudgery associated with the manual input of changes to the pronunciation lexicon.

SUMMARY OF THE INVENTION

In accordance with the present invention, a method for increasing both dialect precision and usability in speech recognition and text-to-speech systems is described. The invention generates non-linear (i.e. encoded) baseform representations for words and phrases from a pronunciation lexicon. The baseform representations are encoded to incorporate both pronunciation variations and dialectal variations. The encoded baseform representations may be later expanded (i.e. decoded) into one or more linear dialect specific baseform representations, utilizing a set of dialect specific phonological rules. The method provides the additional capability for a user specified dialect independent mode, whereby all encoded baseform variations will be included as part of the decoded output lexicon.

According to an illustrative embodiment, words and phrases from a pronunciation lexicon are encoded for both pronunciation and dialectal variations. A single encoded (i.e. non-linear) baseform representation will be stored for each word or phrase that contains a pronunciation and/or dialectal variation. Note that not all words and phrases will contain such variations, and as such they will be stored unencoded as linear baseform representations. Special encoding symbols are used to encode the variations. The encoded baseform representations may be later decoded (i.e. expanded) any number of times as needed into linear output baseform representations that are either dialect specific or dialect independent, depending upon a user specified dialect preference.

In accordance with an embodiment of the present invention, a computer based pronunciation lexicon generation system is formed with a first data file comprised of an encoded lexicon of non-linear baseforms and a second data file having one or more sets of dialect specific phonological rules. The system further includes a computer processor which is operatively coupled to the first and second data files and generates a third output data file therefrom. The output data file is a decoded pronunciation lexicon comprised of a plurality of linear (i.e. decoded) baseform representations. The output data file is generated by the processor which applies dialect specific phonological rules from the second data file to encoded baseform representations in the first data file. In the case where a user does not specify a preferred dialect, all of the phonological rules from the rule set database will be used to decode the first data file.

In one aspect of the invention, a method for generating a dialect specific pronunciation lexicon from an encoded pronunciation lexicon comprises the steps of: constructing an encoded pronunciation lexicon having a plurality of encoded and unencoded baseforms; inputting one or more user specified dialects; selecting dialect specific phonological rules from a rule set database; and decoding the encoded pronunciation lexicon using the dialect specific phonological rules to yield a dialect specific decoded pronunciation lexicon.

The method of the present invention is advantageous because (a) it facilitates the straightforward generation of different baseform sets for different dialects thereby increasing recognition accuracy (b) it eliminates the errors inherent in inputting multiple, sometimes fifty or more, variant baseforms (c) it allows significantly easier updates and corrections because the baseform representation is more perspicuous (d) it requires far less input for the system designer who is establishing the baseforms.

These and other objects, features and advantages of the present invention will become apparent from the following detailed description or illustrative embodiments thereof, which is to be read in connection with the accompanying drawings.

BRIEF DESCRIPTION OF THE DRAWINGS

FIG. 1 is an illustration of a phonetic baseform for the word "economics"

FIG. 2 is an illustration of two phonetic baseforms for a single set of pronunciation alternatives for the word "economics"

FIG. 3 is an illustration of four phonetic baseform representations that describe a single pronunciation alternatives and a single set of dialectal alternatives for the word "economics"

FIG. 5 is a diagram illustrating an example of the encoding of a baseform representation in accordance with an embodiment of the present invention.

DETAILED DESCRIPTION OF PREFERRED EMBODIMENTS

The present invention is directed to a method and apparatus for constructing an encoded pronunciation lexicon including a plurality of encoded (i.e. non-linear) baseforms (i.e. phonetic representations of words and phrases) that can be expanded any number of times to yield a linear pronunciation lexicon comprised of a plurality of linear baseform representations that are either dialect specific or dialect independent. Wherever appropriate, special encoding symbols are used to facilitate the expansion of the non-linear baseforms. Note that not all strings from the encoded pronunciation lexicon contain either dialectal or pronunciation variations, as such, they will be stored unencoded as linear baseform representations in the encoded pronunciation lexicon along with the encoded baseform representations. It is also to be appreciated that while the present invention is preferably implemented at the phone level it is within the scope of the present invention to operate at the phoneme level.

Figure 4:
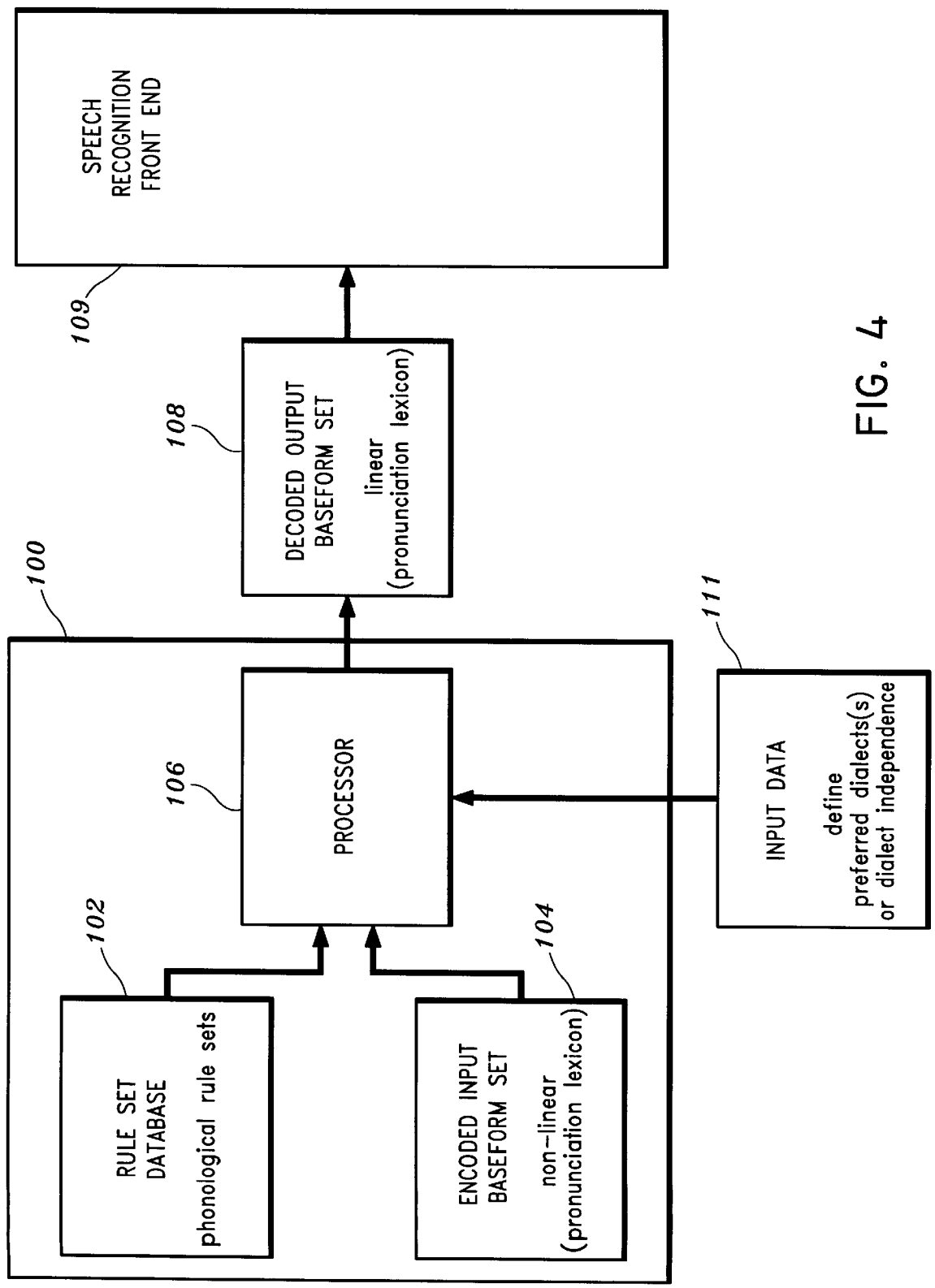
FIG. 4 is a block diagram of a phonetic lexicon generation system according to the present invention.

Referring now to the drawings and initially to FIG. 4, a system block diagram is shown of a baseform module 100. The baseform module 100 includes a rule set database 102 operatively coupled to a processor 106. Additionally, an encoded input baseform set 104 is operatively coupled to the processor 106. The processor 106 generates as output a linear lexicon 108 that is either dialect-specific or dialect-independent.

It is also to be appreciated that the present invention is usable with any speech recognition system and is not, in any way, limited to use with or dependent on any details or methodologies of any particular speech recognition arrangement. In any case, it should be understood that the elements illustrated in FIG. 4 may be implemented in various forms of hardware, software, or combinations thereof. As such, the processor is implemented in software on one or more appropriately programmed general purpose digital computers. Each general purpose computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 4 may be considered to include a suitable and preferred processor architecture for practicing the invention which may be achieved by programming the one or more general purpose processors. Of course, special purpose processors may be employed to implement the invention. The processor is therefore a functional block illustrating the computing facility or facilities executing the respective function. Given the teachings of the invention provided herein, one of ordinary skill in the art will be able to contemplate these and similar implementations of the elements of the invention.

A brief explanation of the functionality of the components of the baseform module 100 will now be given. The processor 106 receives an input one or more user specified dialect preferences via input data module 111. The processor 106 will use the dialect preferences supplied by the user to extract rule sets from the rule set database 102 that are specific to the user specified dialect preferences. For example, if the user selects Northeastern American English then the processor 106 would retrieve both the New England and NY City rule sets, and possibly other rule sets, from the rule set database 102. The user also has the option of selecting a dialect independent mode which is equivalent to specifying all dialects. In that case, the processor will extract the entire rule set database 102. The processor 106 will then retrieve the input baseform set (i.e. input data file). In operation, the processor 106 will apply each rule retrieved from the rule set database 102 to each encoded baseform from the input baseform set 104 to generate a linear output baseform set 108, such that each encoded non-linear baseform representation from the input data file is expanded into one or more linear baseform representations specific to one of the user specified dialects. The expanded linear dialect specific baseform representations are supplied as an baseform set 108 (output data file) to be supplied as input to a speech recognition system front end 109.

Figure 5:
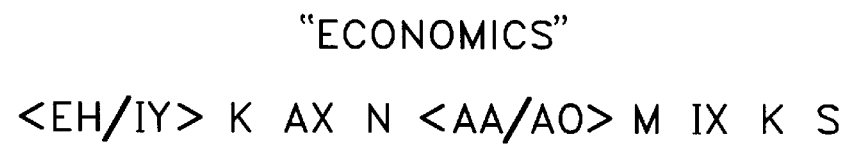

Referring now to FIG. 5, the construction of an encoded input baseform set 104 (i.e. encoded pronunciation lexicon) in accordance with the teachings of the present invention will now be explained. The construction will be illustrated by way of example for a single word, "economics", arbitrarily selected from the input pronunciation lexicon. The example includes a pronunciation alternative at its first phone, "E", and a dialectal alternative at its fifth phone, "O". Note that this or any other word from the pronunciation lexicon could contain multiple sets of multiple dialectal or pronunciation alternatives, each at a particular phone of the word or phrase. Referring to FIG. 5, and the first phone in particular, "E", there is described two pronunciation alternatives, namely, a short vowel pronunciation (EH) and a long vowel pronunciation (IY). The pronunciation alternatives are shown separated by a pronunciation separation symbol (i.e a forward slash character). Other pronunciation separation symbols may be used in other embodiments. In the present embodiment, whenever two or more pronunciation alternatives must be encoded, each alternative will be preferably separated by a forward slash character (i.e. <choice 1/choice 2 / . . . / choice i>. The entire set of pronunciation alternatives are shown as being set off by a pair of group symbols. In the present embodiment, angle brackets ("<",">") are used as group symbols to set off a set of two or more pronunciation or dialectal alternatives. The group symbols serve as starting and ending delimiters to isolate the alternatives from adjacent phones.

The example in FIG. 5 further illustrates a single set of dialectal alternatives at the fifth phone wherein each alternative is separated by a dialectal separation symbol. In the preferred embodiment, a backward slash "\" character is used as the dialectal separation symbol. Other embodiments may use other symbols to denote the dialectal separation symbol.

In general, regardless of which symbols are used to denote the encoding symbols (i.e. dialectal, pronunciation, group) there must be consistency between the encoding symbols used and the phonological rules that parse the encoded string. That is, given that the rules are used to parse the encoded baseform representations, their symbology must be consistent with the encoding symbols.

Figure 6:
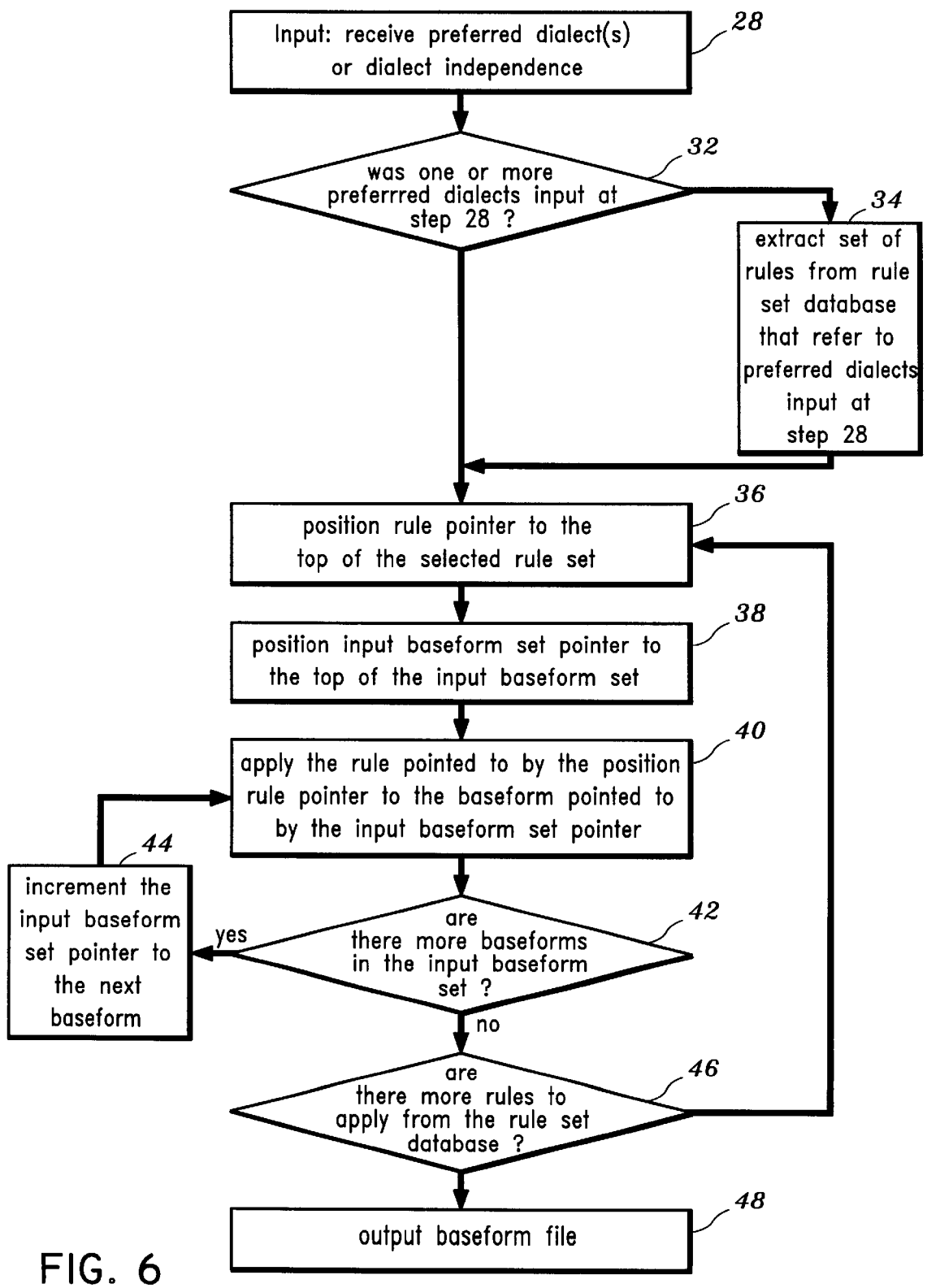
FIG. 6 is a flow chart illustrating an embodiment of a method for generating a dialect-specific output baseform set from an encoded input baseform set according to the present invention.

A detailed description of a preferred method of generating a dialect specific or dialect independent output linear baseform set from a non-linear (i.e. encoded) input baseform set will now be given in the context of FIGS. 5 and 6.

The detailed description that follows assumes the prior construction of an encoded pronunciation lexicon 104 in accordance with the teachings of the present invention, as described at FIG. 5. The description further assumes the existence of a rule set database including a plurality of dialect specific rule sets.

Accordingly, at step 28 (FIG. 6), the system receives an input 111 (FIG. 4) one or more user specified dialect preferences, or in the alternative, a dialect independent mode. At step 32, a determination is made concerning whether the user has selected a dialect preference. At step 34, If the user selects one or more dialects a rule set corresponding to each of the selected dialects will be extracted from the rule set database 102 (FIG. 4). It is important to note that particular rules from the rule set database may be contained within one or more rule sets. If a user selects the dialect independent mode, then the system will retrieve and apply all of the rule sets from the rule set database 102. At step 36, a "rule" pointer is positioned to the first extracted rule from the retrieved rule set. At step 38, an "encoded baseform" pointer is positioned at the first encoded baseform from the retrieved encoded pronunciation lexicon 104. At step 40, the rule pointed to by the rule pointer is applied to the encoded baseform pointed to by the encoded baseform pointer. The application of a rule to an encoded baseform is best illustrated by example. Referring again to FIG. 5, the encoded baseform representation for the exemplar "economics" is shown as:

<EH/IY>K AX N <AA\AO> M IX K S where a dialectal alternative is encoded for both the English of the New York City area "AA" and Canada "AO" at the fifth phone. Assume, for the present example, that a user specifies a dialectal preference for the English of New York City, the first rule from a rule set specific to the English of New York City might therefore read:

RULE 1: <AA\AO>→AA

That is, whenever a dialectal alternative appears as described by the left side of rule 1, choose the first alternative, "AA", corresponding to the dialect of N.Y. City. In certain cases, multiple adjacent phones will require analysis prior to selecting one alternative over another. The particular manner in which the encoded baseform representations are parsed to make such selections are well known in the art and not critical for purposes of the present application.

At step 42, a determination is made as to whether there are additional encoded baseforms in the encoded pronunciation lexicon to be decoded. If so, the process returns to step 40 to position the encoded baseform pointer to the next encoded baseform from the input data file. When the list of encoded baseforms has been exhausted, the encoded baseform pointer is re-initialized to the first encoded baseform in the encoded pronunciation file 104 (FIG. 4). At that time, the rule pointer is incremented to the next rule from the selected rule set. Each encoded baseform representation is then processed by the next rule at steps 38 through 42. At step 46, when the rule pointer is incremented past the last rule extracted from the rule set database, the process terminates at step 48.

Having described preferred embodiments of a method for increasing both dialect precision and usability in speech recognition and text-to-speech systems, it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed:

1. A method for generating a dialect specific pronunciation lexicon, the method comprising the steps of:
   a) constructing an encoded pronunciation lexicon, said encoded pronunciation lexicon including a plurality of nonlinear baseforms encoded nonlinearly to include one of dialectal and pronunciation alternatives;
   b) inputting one or more user specified dialects;
   c) selecting phonological rule sets from a rule set database responsive to said one or more user specified dialects; and
   d) decoding the encoded pronunciation lexicon by applying the phonological rule sets to the encoded pronunciation lexicon yielding a dialect specific decoded pronunciation lexicon including a plurality of linear dialect specific baseforms.

2. The method of claim 1, wherein the step of constructing an encoded pronunciation lexicon further comprises encoding one or more phones of a plurality of linear baseforms from a pronunciation lexicon.

3. The method of claim 2, wherein the step of encoding at least one phone of the plurality of linear baseforms further comprises encoding said one or more phones with a set of two or more pronunciation alternatives, wherein each alternative is separated by a pronunciation separation symbol.

4. The method of claim 3, wherein the encoding of said one or more phones further includes a start group symbol and an end group symbol for setting off each set of pronunciation alternatives.

5. The method of claim 2, wherein the step of encoding at least one phone of the plurality of linear baseforms further comprises encoding said one or more phones with a set of two or more dialectal alternatives, wherein each alternative is separated by a dialectal separation symbol.

6. The method of claim 5, wherein the encoding of said one or more phones further includes a start group symbol and an end group symbol for setting off each set of dialectal alternatives.

7. The method of claim 1, wherein the rule set database is comprised of a plurality of dialect specific phonological rule sets, wherein each rule set further comprises a plurality of dialect specific phonological rules.

8. The method of claim 1, wherein the phonological rule sets are comprised of a plurality of dialect specific phonological rules, wherein a subset of said phonological rules define how one of said pronunciation alternatives is selected from the set of pronunciation alternatives.

9. The method of claim 1, wherein the phonological rule sets are comprised of a plurality of dialect specific phonological rules, wherein a subset of said phonological rules define how one of said dialectal alternatives is selected from the set of dialectal alternatives.

10. The method of claim 1, wherein the step of inputting one or more user specified dialects further comprises the step of characterizing a speaker's accent through the use of diagnostic phrases.

11. The method of claim 1, wherein the step of inputting one or more user specified dialects further comprises the step of interacting with a user via a touch screen display having maps of residence history.

12. The method of claim 1, wherein the step of decoding the pronunciation lexicon using the phonological rules further comprises:

retrieving rule sets from said rule set database corresponding to said user specified dialects; and applying each of said rules contained within said retrieved rule sets to each of said plurality of encoded baseforms to yield a plurality of decoded baseforms.

13. A dialect specific pronunciation lexicon generating apparatus comprising:

means for constructing an encoded pronunciation lexicon, said pronunciation lexicon including a plurality of baseforms encoded nonlinearly to include one of dialectal and pronunciation alternatives.;

means for inputting one or more user specified dialect preferences; and means for decoding the encoded pronunciation lexicon.

14. The dialect specific pronunciation lexicon generating apparatus as claimed in claim 13, wherein:

the construction means encodes one or more phones of a plurality of linear baseforms with dialectal and pronunciation variations.

15. The dialect specific pronunciation lexicon generating apparatus as claimed in claim 13, wherein:

the input means comprises a microphone for characterizing a speaker's accent through the use of diagnostic phrases.

16. The dialect specific pronunciation lexicon generating apparatus as claimed in claim 13, wherein:

the input means comprises a touch screen display for displaying maps of a speaker's residence history.

17. The dialect specific pronunciation lexicon generating apparatus as claimed in claim 13, wherein the decoding means further comprises:

means for selecting one or more dialect specific phonological rule sets from a rule set database;

means for applying said one or more dialect specific phonological rule sets to said encoded pronunciation lexicon.

18. A computer program device readable by a machine, tangibly embodying a program of instructions executable by the machine to perform method steps for generating a dialect specific pronunciation lexicon, the method comprising the steps of:

a) constructing an encoded pronunciation lexicon, said encoded pronunciation lexicon including a plurality of nonlinear baseforms encoded nonlinearly to include one of dialectal and pronunciation alternatives;

b) inputting one or more user specified dialects;

c) selecting phonological rule sets from a rule set database responsive to said one or more user specified dialects; and d) decoding the encoded pronunciation lexicon by applying the phonological rule sets to the encoded pronunciation lexicon yielding a dialect specific decoded pronunciation lexicon including a plurality of linear dialect specific baseforms.

19. The method of claim 18, wherein the step of constructing an encoded pronunciation lexicon further comprises encoding one or more phones of a plurality of linear baseforms from a pronunciation lexicon.

20. The method of claim 19, wherein the step of encoding at least one phone of the plurality of linear baseforms further comprises encoding said one or more phones with a set of two or more pronunciation alternatives, wherein each alternative is separated by a pronunciation separation symbol.

21. The method of claim 20, wherein the encoding of said one or more phones further includes a start group symbol and an end group symbol for setting off each set of pronunciation alternatives.

22. The method of claim 19, wherein the step of encoding at least one phone of the plurality of linear baseforms further comprises encoding said one or more phones with a set of two or more dialectal alternatives, wherein each alternative is separated by a dialectal separation symbol.

23. The method of claim 18, wherein the rule set database is comprised of a plurality of dialect specific phonological rule sets, wherein each rule set further comprises a plurality of dialect specific phonological rules.

24. The method of claim 18, wherein the step of decoding the pronunciation lexicon using the phonological rules further comprises:

retrieving rule sets from said rule set database corresponding to said user specified dialects; and applying each of said rules contained within said retrieved rule sets to each of said plurality of encoded baseforms to yield a plurality of decoded baseforms.

* * * * *